United States Patent
Bienas et al.

(10) Patent No.: US 8,428,015 B2
(45) Date of Patent: Apr. 23, 2013

(54) PERMANENT DEDICATED RANDOM ACCESS PREAMBLES FOR FEMTOCELL

(75) Inventors: Maik Bienas, Braunschweig (DE); Hyung-Nam Choi, Hamburg (DE)

(73) Assignee: Intel Mobile Communications GmbH, Neubiberg (DE)

(*) Notice: Subject to any disclaimer, the term of this patent is extended or adjusted under 35 U.S.C. 154(b) by 428 days.

(21) Appl. No.: 12/493,259

(22) Filed: Jun. 29, 2009

(65) Prior Publication Data
US 2010/0329193 A1    Dec. 30, 2010

(51) Int. Cl.
*H04W 4/00*    (2009.01)
(52) U.S. Cl.
USPC .......................................................... 370/329
(58) Field of Classification Search .................. 370/329, 370/310, 335, 325; 455/411
See application file for complete search history.

(56) References Cited

U.S. PATENT DOCUMENTS

| | | | |
|---|---|---|---|
| 2006/0239239 A1 | 10/2006 | Yang | |
| 2008/0232283 A1* | 9/2008 | Jen | 370/310 |
| 2008/0232317 A1* | 9/2008 | Jen | 370/329 |
| 2008/0232329 A1* | 9/2008 | Jen | 370/335 |
| 2009/0042582 A1 | 2/2009 | Wang et al. | |
| 2009/0129335 A1 | 5/2009 | Lee et al. | |
| 2009/0135761 A1* | 5/2009 | Khandekar et al. | 370/328 |
| 2010/0112980 A1* | 5/2010 | Horn et al. | 455/411 |

FOREIGN PATENT DOCUMENTS

| | | |
|---|---|---|
| CN | 101366206 A | 2/2009 |
| WO | 2008133579 A1 | 11/2008 |
| WO | 2009041784 A2 | 4/2009 |

OTHER PUBLICATIONS

Changes to TS36.300 agreed in RAN3#61 bis and RAN3#62, Ericsson, Chapter 4.6, pp. 1-146 3GPP document No. R3-083577.

* cited by examiner

*Primary Examiner* — Albert T Chou

(57) ABSTRACT

Methods and apparatuses for allocating permanent dedicated preambles for connection with a femtocell. Various embodiments include selecting one or more mobile communication devices to be a main device, assigning the permanent dedicated preambles to each of the one or more main devices, transmitting the assigned permanent dedicated preambles to the one or more main devices, storing a relation of the assigned permanent dedicated preambles in a memory of the one or more main devices, and explicitly releasing one or more of the assigned permanent dedicated preambles when a release condition is met.

25 Claims, 8 Drawing Sheets

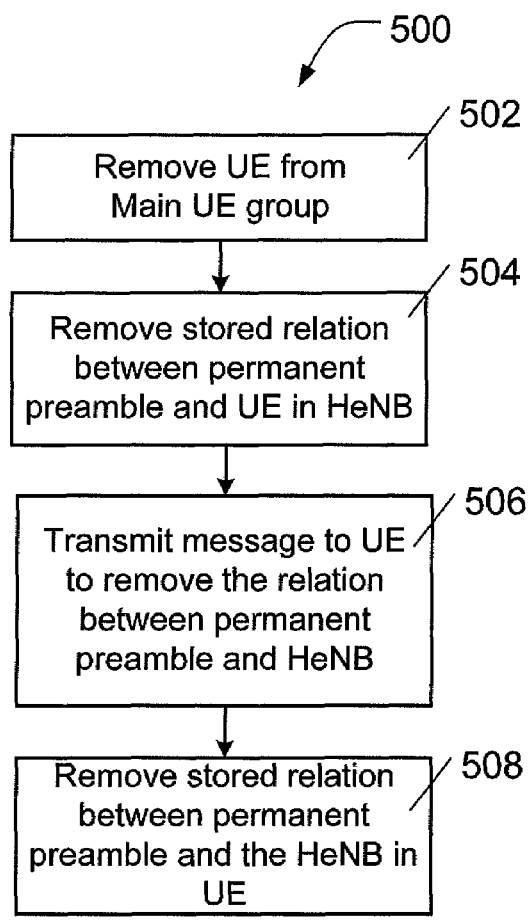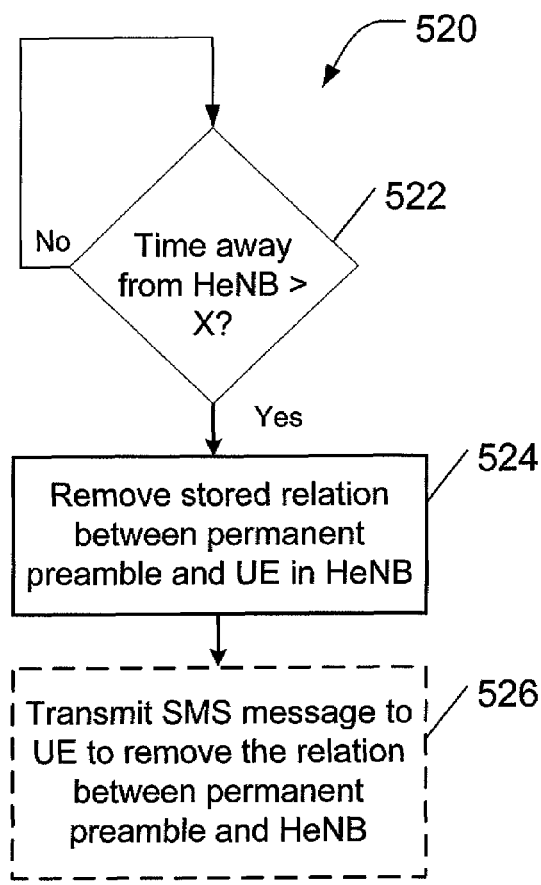
FIG. 5A
FIG. 5B

PERMANENT DEDICATED RANDOM ACCESS PREAMBLES FOR FEMTOCELL

BACKGROUND

One mobile communication network element is a base transceiver station (also referred to as base station or NodeB or eNodeB) that typically contains radio frequency transmitters and receivers used to communicate directly with mobile radio communication terminal devices, such as mobile telephones, that move freely within a communication range of one or more such base stations. A type of base station, known as a femtocell may soon be added to many mobile radio communication networks.

A femtocell may be understood to be a modified base station for use in buildings or home environments in order to increase or improve the in-building coverage of the network. A typical use for such a femtocell may be, for example, in the home or apartment of a mobile radio communication terminal device user. The user would use a broadband (possibly wired) network connection, such as a conventional digital subscriber line (DSL) connection, to connect a femtocell to the user's mobile radio operator's core network. This usage may be beneficial for both the user and the mobile radio communication network operator, since the user may save money and battery power on his mobile radio communication terminal device due to improved coverage within his home or building, and the operator may receive additional network coverage and save on energy costs.

Mobile radio communication terminal devices may perform a "random access procedure" in order to establish a wireless connection with a base station or femtocell. A mobile radio communication terminal device may randomly select a mobile radio resource for transmission from a predefined set of mobile radio resources. A mobile radio resource may be, for example, a certain time slot at a certain radio frequency with a certain code. This access scheme is subject to collisions as a requesting mobile radio communication terminal device may request the same mobile radio resources already selected by another mobile radio communication terminal device. Collisions are undesirable because they waste mobile radio resources and increase transmission delays. To keep the collisions at an acceptable level, the amount of reserved mobile radio resources are conventionally aligned with the number of expected random accesses for each mobile radio cell. If the amount of reserved mobile radio resources is too large, the system performance wastes unused mobile radio resources. Therefore, it is important to properly balance reserved mobile radio resources with the anticipated traffic of a wireless mobile radio communication network cell.

SUMMARY

Various embodiments provide methods and apparatuses for allocating permanent dedicated preambles for connection with a femtocell, including selecting one or more mobile communication devices to be a main device, assigning the permanent dedicated preambles to each of the one or more main devices, transmitting the assigned permanent dedicated preambles to the one or more main devices, storing a relation of the assigned permanent dedicated preambles in a memory of the one or more main devices, and explicitly releasing one or more of the assigned permanent dedicated preambles when a release condition is met.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various embodiments. In the following description, various embodiments are described with reference to the following drawings, in which:

FIGS. 5A-5D are flowcharts of methods for releasing a permanent dedicated preamble in accordance within an embodiment;

DESCRIPTION

Figure 1:
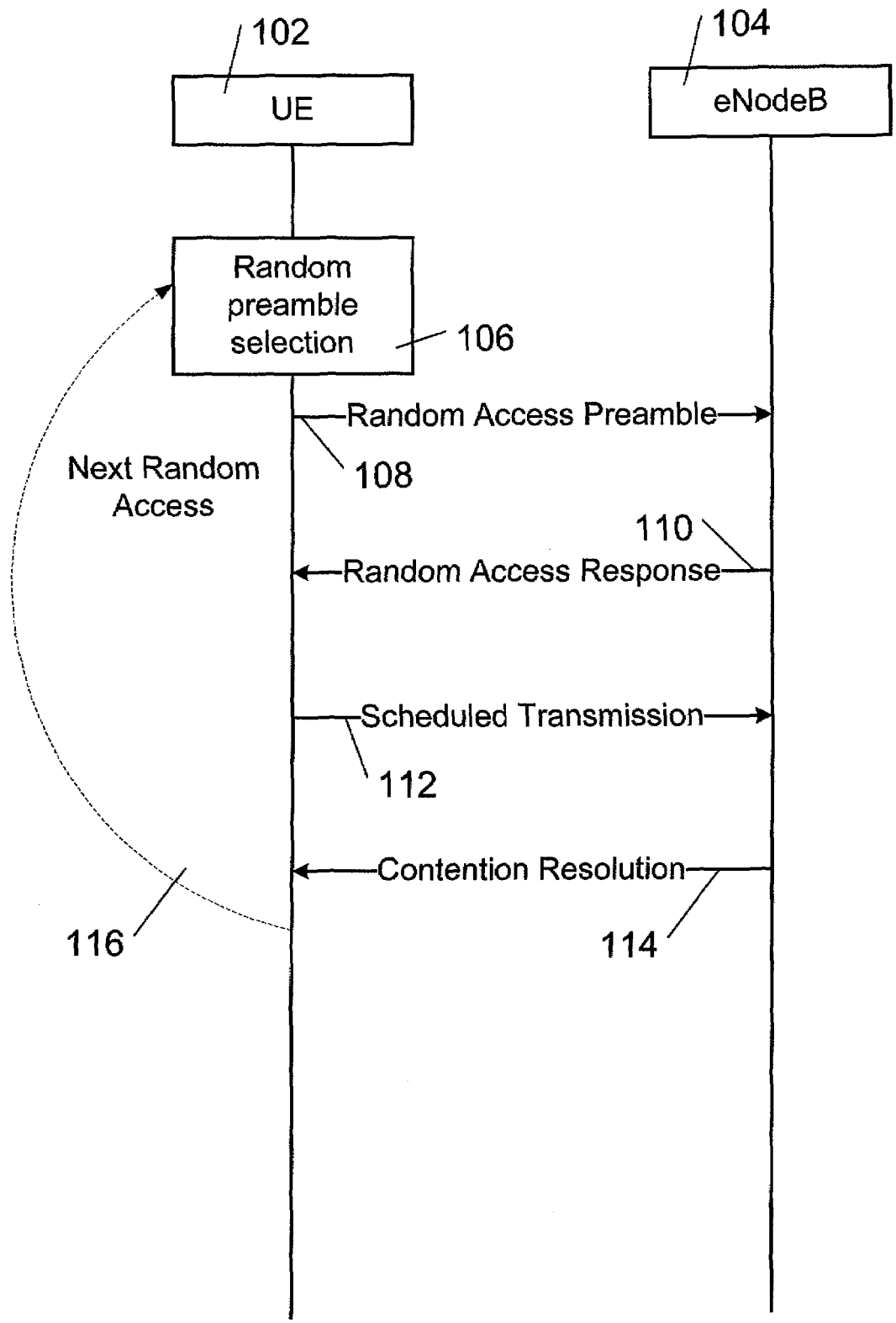
FIG. 1 shows a conventional message flow for performing a contention based random access procedure with an eNodeB.

The following detailed description refers to the accompanying drawings that show, by way of illustration, specific details in which embodiments may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

The following embodiments will be disclosed on the basis of a data communication relationship between a femtocell and a user equipment (UE). In this case, a femtocell is used as a node of a network and can directly communicate with a UE.

The term "femtocell" may be replaced with access point base station, Home Node B (HNB), or Home eNode B (HeNB). The term "Home eNodeB" (HeNB) is used for the radio access technologies (RAT) OFDMA/SC-FDMA according to LTE. The term "Home Node B" (HNB) is used for the radio access technology (RAT) W-CDMA.

In various embodiments, a 'Home NodeB' may be understood in accordance with 3GPP as a trimmed-down version of a cellular mobile radio base station optimized for use in residential or corporate environments (e.g., private homes, public restaurants or small office areas). In various examples throughout this description, the terms 'Home Base Station', 'Home NodeB', 'Home eNodeB', and 'Femtocell' are referring to the same logical entity and will be used interchangeably throughout the entire description.

The so-called 'Home Base Station' concept shall support receiving and initiating cellular calls at home, and uses a broadband connection (typically DSL, cable modem or fibre optics) to carry traffic to the operator's core network bypassing the macro network architecture (including legacy NodeBs or E-NodeBs, respectively), i.e. the legacy UTRAN or E-UTRAN, respectively. Femto Cells shall operate with all existing and future handsets rather than requiring customers to upgrade to expensive dual-mode handsets or UMA devices.

From the customer's perspective, 'Home NodeBs' offer the user a single mobile handset with a built-in personal phonebook for all calls, whether at home or elsewhere. Furthermore, for the user, there is only one contract and one bill. Yet another effect of providing 'Home NodeBs' may be seen in the improved indoor network coverage as well as in the increased traffic throughput. Moreover, power consumption may be reduced as the radio link quality between a handset and a 'Home Base Station' may be expected to be much better than the link between a handset and legacy 'NodeB'.

As a 'Femto Cell' entity or 'Home Base Station' entity will usually be a box of small size and physically under control of the user, in other words, out of the mobile radio network operator's (MNO's) domain, it could be used nomadically, i.e. the user may decide to operate it in his apartment, but also in a hotel when he is away from home, e.g. as a business traveler. Additionally a 'Home NodeB' may be operated only temporarily, i.e. it can be switched on and off from time to time, e.g. because the user does not want to operate it over night or when he leaves his apartment.

The term "user equipment" may be replaced with mobile radio communication terminal device (MCD), mobile phone, or terminal device.

The following embodiments may be implemented by hardware, firmware, software, or a combination of them. In the case of a hardware implementation, embodiments may be implemented with ASICs (application specific integrated circuits), DSPs (Digital signal processors), DSPDs (digital signal processing devices), PLDs (programmable logic devices), FPGAs (field programmable gate arrays), a processor, a controller, a microcontroller, or a microprocessor, etc. . . .

If operations or functions of embodiments are implemented by firmware or software, the embodiments may be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

In various embodiments, terminal devices, or UEs, perform a "random access procedure" in order to establish a wireless connection with a mobile radio base station or femtocell. A UE randomly selects a resource for transmission from a predefined set of mobile radio resources. A mobile radio resource may be, for example, a certain time slot at a certain frequency with a certain code. This access scheme is subject to collisions as a requesting UE may request the same resources already selected by another UE. Collisions are undesirable because they waste mobile radio resources and increase transmission delays. To keep the collisions at an acceptable level, the amount of reserved mobile radio resources are aligned with the number of expected random accesses for each mobile radio cell. If the amount of reserved mobile radio resources is too large, the system performance wastes unused mobile radio resources. Therefore, it may be desired to properly balance reserved mobile radio resources with the anticipated traffic of a wireless mobile radio network cell.

The random access preambles may be organized into 3 groups. The first two groups, group A and group B, may contain preambles for contention-based random access procedures. The preambles from the third group may be dedicatedly assigned to UEs. The third group preambles may be used for contention-free random access procedures.

FIG. 1 shows a conventional message flow for performing a contention based random access procedure with an eNodeB.

Depending on the message size UE 102 will transmit, UE 102 chooses randomly a preamble from group A or group B at 106 when performing a contention-based random access procedure. For messages larger than a certain size, UE 102 chooses a preamble from group B, otherwise UE 102 chooses a preamble from group A. UE 102 transmits the preamble to eNodeB 104 in the next available RACH occasion at 108. The position in frequency and time of these RACH occasions is configured by the mobile radio network and broadcasted within the system information. If a collision occurs at 108, UE 102 may restart the contention based random access procedure.

UE 102 listens to the response from eNodeB 104 and obtains information about the mobile radio resources to use for the scheduled transmission at 110. Random Access Response 110 contains, among other things, the received random access preamble ID (RAPID) of UE 102 and a cell radio network temporary ID (C-RNTI) assigned to UE 102. After reception of the response, UE 102 transmits the scheduled transmission via the assigned mobile radio resource at 112 and listens to the next response from eNodeB 104. The response at 114 indicates whether the message is received without contention and ends the contention-based random access procedure. If a collision occurs at 112, UE 102 may restart the contention based random access procedure.

For the subsequent random access procedures, the same procedure is repeated at 116. That is, UE 102 must randomly select another preamble each time UE 102 transmits a message or experiences a collision, with a few exceptions detailed below.

Figure 2:
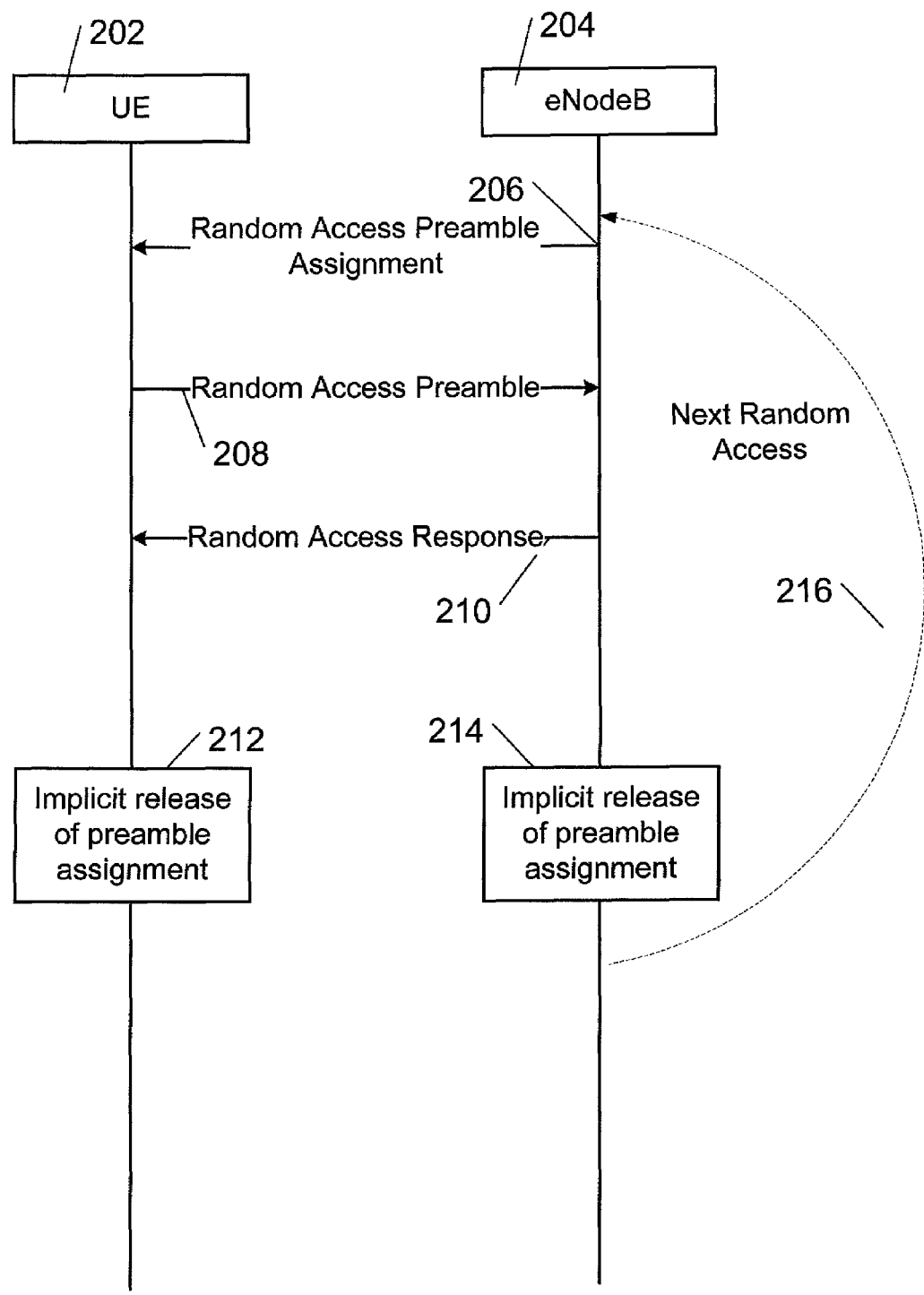
FIG. 2 shows a conventional message flow for performing a non-contention based random access procedure with an eNodeB.

FIG. 2 shows a conventional message flow for performing a non-contention based random access procedure with an eNodeB.

UE 202 is scheduled for non-contention based transmission and obtains a dedicated preamble at 206 from eNodeB 204 prior to the start of the transmission of UE 202. The transmission is non-contention based because eNodeB 204 selects an unused preamble for UE 202. At 208, UE 202 decides to transmit the assigned preamble in the next available RACH occasion and listens to the response from eNodeB 204. eNodeB 204 sends a random access response at 210. This ends the non-contention based random access procedure.

This procedure is faster and more reliable than the contention-based procedure shown in FIG. 1, but it needs a connection setup prior to the execution, which is not always possible. Further, the number of dedicated preambles are limited. Therefore, non-contention based random access procedures may not be suitable for all UEs within the coverage of a conventional base station. It is applied only in special cases as described below. Currently, the assignment of the dedicated preamble is released implicitly (i.e., without further signaling) by UE 202 and eNodeB 204 at 212 and 214 respectively after each usage. Thus, a mobile radio communication network, via eNodeB 204, has to assign a dedicated preamble for each usage by UE 202 at 216 if a non-contention based transmission is desired.

In at least five cases a random access procedure is performed:

1. An idle UE accesses the mobile radio communication network (e.g., initial access from the radio resource control (RRC) state RRC_IDLE);

2. A connected UE loses the connection and re-connects (e.g., connection re-establishment);

3. A network instructs a UE to handover to another mobile radio cell;

4. Data for a connected UE arrives at a mobile radio core network, but the connected UE's downlink is not synchronized (e.g., downlink (DL) data arrival during the radio resource control (RRC) state RRC_CONNECTED requiring radio access (RA) procedure); and 5. A connected UE is instructed to transmit data, but the connected UE's uplink is not synchronized (e.g., uplink (UL) data arrival during the radio resource control (RRC) state RRC_CONNECTED requiring radio access (RA) procedure).

In all five cases the contention based random access procedure may be used. Currently, the contention-free random access procedure is designed for cases three and four.

In Long Term Evolution (LTE) mobile radio communication networks, each mobile radio cell offers 64 different random access preambles. The number of preambles for contention-based random access is scalable between 4 and 64 preambles for each mobile radio cell. The amount of random access resources is scalable in an LTE mobile radio communication system by changing the number of RACH occasions within a time frame. RACH occasions are scalable from 1 to 20 occasions within a 20 millisecond time frame. RACH occasion scaling is used to adapt the amount of random access mobile radio resources to match a mobile radio network's mobile radio resource needs.

The preamble duration is also scalable by four steps: from approximately 0.9 ms to approximately 2.3 ms. A preamble duration or 0.9 ms is suitable for mobile radio cells with a maximum radius of 15 km, whereas the longest preambles are suited for mobile radio cells with a maximum radius of 100 km.

Based on the possible conventional configurations for performing a contention based random access procedure within an LTE mobile radio communication network, a configuration for a mobile radio femtocell may set the preamble duration to the smallest duration, 0.9 ms, because a femtocell mobile radio cell radius is typically about 100 Meters. The femtocell mobile radio cell radius, however, is much smaller than the maximum possible radius, 15 km, that the preamble duration can support. The number of preambles for the contention-based random access procedure is set to the smallest value of 4, because the average number of users that start the random access procedure in the same RACH occasion is likely below 1. The number of RACH occasions is set to the lowest frequency: once every 20 ms.

There may be at least three effects of the above conventional configuration.

First, the average delay for the random access procedure is high due to the 20 ms window between each RACH occasion. This can be reduced by increasing the number of RACH occasions, but at a cost of wasted mobile radio resources.

Second, a UE has to use a contention-based random access procedure with a femtocell in at least cases 1, 2, and 5 as described above. This may lead to contention and therefore delay when two or more mobile radio communication terminal devices perform the random access procedure.

Third, there is no mean to prioritize the access to the femtocell. For example, in the case of open access, main users have to compete with foreign users for access. Thus, access may be delayed for the main UEs due to collisions when many foreign UEs attempt to access the femtocell.

Embodiments may reduce the delays of random access procedures, the occurrence of collisions, and prioritize access for main UEs.

Embodiments include a method for allocating permanent dedicated preambles for performing a non-contention based random access procedure with a femtocell, or, in more general terms, a mobile radio base station with fewer users and smaller coverage areas than a conventional mobile radio base station. Embodiments may also be implemented for conventional mobile radio base stations, which support a large coverage area and high number of users.

In some embodiments, UEs connected to a femtocell may be categorized into two classes: main UEs and other UEs. Main UEs may be, for example, inhabitants of the house where the femtocell operates. In some embodiments, main UEs obtain a permanent dedicated preamble for random access with the femtocell. Main UEs use a non-contention based random access procedure for some or all kinds of random access. For example, of the five random access cases listed above a Main UE may use non-contention based random access procedure for some or all of the five random access cases. Any other random access case is within the scope of embodiments as well.

In some embodiments, the permanent dedicated preamble is assigned to a main UE during a first successful connection setup or it is assigned by using, for example, a short message service (SMS). The assignment may be released when a main UE has been removed from the mobile radio cell, the classification of the UE changed from "main UE" to "other UE", a timer of inactivity of a main UE expires, or a main UE is turned off.

Assignments may be released permanently or temporarily. If an assignment for a UE is released permanently, then a UE will have to be selected to be a main UE again in order to utilize a permanent dedicated preamble. If an assignment is released temporarily, a UE can still utilize its permanent dedicated preamble whenever it is possible to do so.

Thus, the delay for random access is minimized for main UEs because main UEs do not have to randomly select a random access preamble to perform a random access procedure with a femtocell. This may save mobile radio resources on the air interface and also may reduce or minimize delay by avoiding re-attempts due to collisions. Thus, the conventional tradeoff between delay time and resource usage is avoided.

In some embodiments, main UEs are prioritized over other UEs. This ensures reliable service delivery.

Each main UE using a permanent dedicated preambles may be identified by a femtocell based on the transmitted permanent dedicated preamble. Since in some embodiments the permanent dedicated preambles are assigned un-ambiguously to a main UE, a femtocell may be aware of which main UEs are currently within the femtocell's coverage area.

Embodiments may be backwards compatible. That is, embodiments may be compatible with legacy UEs not capable of utilizing permanent dedicated preambles. Legacy UEs can performing a contention based random access procedure in the conventional way.

Other UEs (i.e., UEs that are not main UEs) may perform a conventional random access procedure by using the contention-based random access procedure via a randomly selected preamble from the set of contention-based preambles. Therefore, in some embodiments HeNB transmits the conventional RACH occasions, but typically with parameters appropriate for small mobile radio cells as described above. Further, the HeNB may listen to random access preambles intended for conventional contention-based access.

Figure 3:
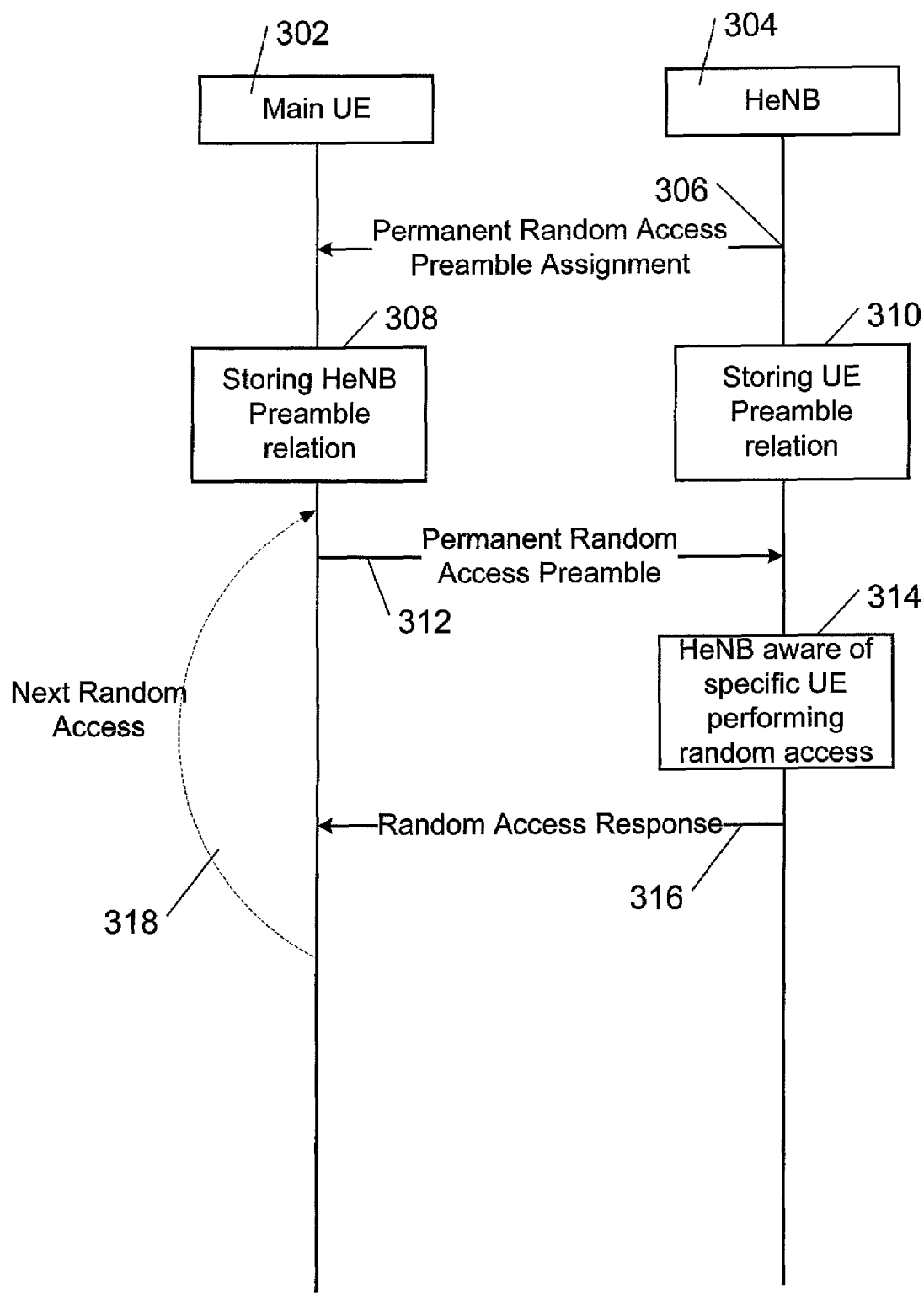
FIG. 3 shows a message flow for performing a non-contention based random access procedure within an embodiment.

FIG. 3 shows a message flow performing a contention based random access procedure in accordance with an embodiment.

At 306, HeNB 304 transmits an assigned permanent dedicated random access preamble to main UE 302 for any case of random access. In some embodiments, the permanent dedicated preamble allows for permanent usage for some cases of random access. In some embodiments, the assignment takes place during the first connection between a main UE 302 and the HeNB 304 via a direct transmission, SMS, or comparable methods. In some embodiments, a UE is designated as a main UE by causing a HeNB to store an identification number of the main UE. Thus, HeNB 304 may identify main UE 302 un-ambiguously. Main UE 302 may use the permanent dedicated preamble multiple times until the assignment is explicitly released, for example.

As used herein, explicitly releasing an assigned permanent dedicated preamble involves some sort of signaling or absence of signaling between a main UE and femtocell. For example, signaling or an absence of signaling may cause a main UE and/or a femtocell to release a permanent dedicated preamble, remove a permanent dedicated preamble relation, and/or similar actions.

At 308, UE 302 stores the relation between HeNB 304 and the assigned permanent dedicated preamble. In some embodiments, this may be accomplished by linking a mobile radio cell ID of HeNB 304 with the assigned permanent dedicated preamble. At 310, HeNB 304 stores the relation between UE 302 and the assigned permanent dedicated preamble. In some embodiments, this may be accomplished by linking a mobile radio cell number of UE 302 with the assigned permanent dedicated preamble.

In some embodiments, a HeNB does not store the relation between a main UE and the assigned permanent dedicated preamble, but rather implicitly recognizes main UEs. For example, a HeNB may assume UEs with preambles starting with a certain number are main UEs or some other identifying characteristic. Such a HeNB may listen to all possible preambles beginning with the identifying characteristic.

At 312, UE 302 transmits the assigned permanent dedicated preamble during a RACH occasion and listens to the response from HeNB 304. At 314, HeNB 304 is aware of UE 302 performing the random access procedure because of the stored UE preamble relation performed at 310. The assigned permanent dedicated preamble may be used for some or all kinds of random accesses towards HeNB 304. HeNB 304 sends a random access response at 316. UE 302 may repeat random access procedures with HeNB 304 at 318.

Figure 4:
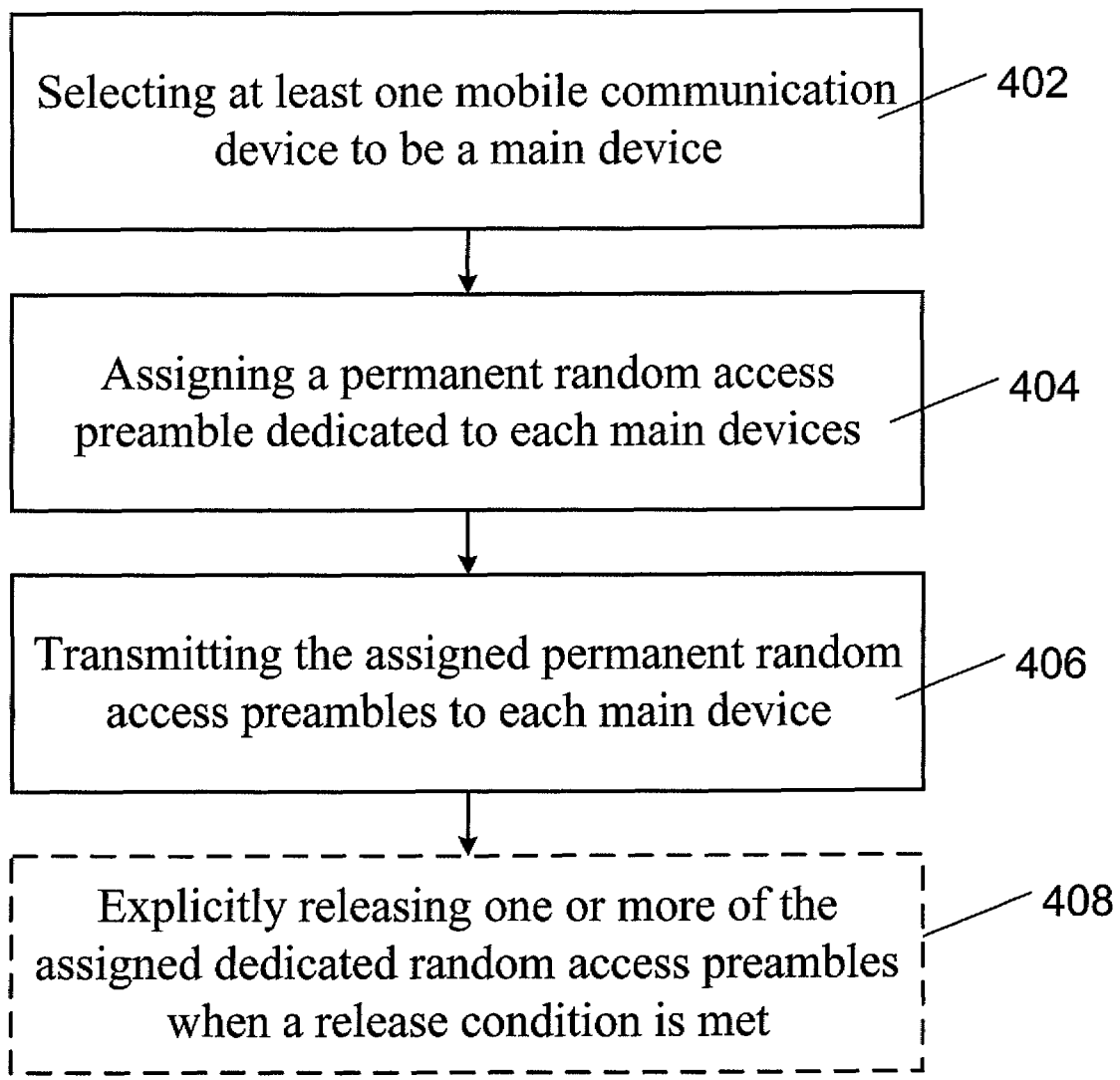
FIG. 4 shows a flowchart of a method to assign and release permanent dedicated preambles in accordance within an embodiment.

FIG. 4 shows a flowchart of a process to assign and release permanent dedicated preambles in accordance with an embodiment. At 402, at least one mobile communication device is selected to be a main device. Selecting may be carried out automatically or manually. For example, a UE may become a main device if associated with a user account or frequently performs a random access procedure with a femtocell. In some embodiments, the owner of a femtocell can add and remove UEs from the a group of main UEs by a PC linked to a femtocell.

At 404, a permanent random access preamble is dedicated to each main device of the one or more predetermined main devices. At 406, a base station, femtocell, HNB, or HeNB transmits the assigned dedicated random access preambles to each main device. At 408, a permanent random access preamble may be explicitly released when a release condition is met.

An embodiment is given below. An HeNB may be operated in the following modes: closed, semi-open or open access. In case of closed access only UEs which are members of the corresponding so-called Closed Subscriber Group (CSG) are allowed to access to HeNB. In case of semi-open access members of CSG and other UEs are allowed to access to HeNB. And finally in case of open access any UEs are allowed to access to HeNB. In contrast to regular eNodeBs, the number of active terminal devices supported by a HeNB may be very low, especially for the cases of closed and semi-open access. Further, it is most likely that mainly the same few users want to connect to a HeNB, e.g. the inhabitants of the house or apartment in which the HeNB is operated.

The owner of the HeNB can add and remove UEs from the group of main UEs. The main UEs periodically transmit the permanent dedicated preambles when they are in idle mode within the coverage area of the corresponding HeNB. This enables the HeNB to be aware whether a main UE is present (i.e., within coverage area) or absent.

In an example embodiment, a HeNB is operated in a semi-open mode, wherein some mobile radio resources are open for public use and other mobile radio resources are restricted to members of a closed subscriber group (CSG). In this example embodiment, four UEs (UE#1 through UE#4) are members of the CSG. The owner of the HeNB decides to configure and activate a HeNB to assign permanent dedicated preambles. He signs into the HeNB via his PC, which is connected to the HeNB. He enters the configuration menu where a list of the current CSG members is displayed. Each entry in the list could be marked as a main UE. In this case the corresponding UE will obtain a permanent dedicated preamble. The owner decides to mark UE#1 through UE#3 as main UEs, because the users of these UEs are flatmates. The user of UE#4 is a friend, but not a flatmate. Therefore, UE#4 is not marked as a main UE.

The HeNB checks which of the UEs newly marked "main UE" are currently within the coverage area. In this example, UE#1 is within the coverage area of the HeNB. That is, the HeNB is aware of the presence of UE#1 and has the ability to establish a direct connection to it. Therefore, the HeNB establishes a connection to UE#1 and assigns the permanent dedicated preamble #1 to UE#1. The relation between the UE#1 and the preamble is stored in the HeNB. The UE#1 stores the relation between this HeNB and the preamble #1 by associated the mobile radio cell ID of HeNB with preamble #1. The relation can be stored on the (U)SIM or on another storage area within a UE. UE#1 will use this preamble for all kind of random accesses with the HeNB.

In this example, UE#2 and UE#3 are currently not in the coverage area of the HeNB. The HeNB may wait until these UE#2 and UE#3 enters the mobile radio cell to transmit the assigned permanent random access preambles or transmit the preambles via a short message service (SMS) or comparable methods. The HeNB stores the UE Preamble relations by associating the Mobile Subscriber ISDN Numbers (MSISDN) of the main UEs with the permanent random access preamble.

After successful assignment of the preambles, the list of CSG members stored in the HeNB may look as follows:

| User friendly Name | MSISDN | Main UE? | Assigned permanent dedicated preamble |
|---|---|---|---|
| UE#1 | +491711234567 | Yes | Preamble #1 |
| UE#2 | +491712345678 | Yes | Preamble #2 |
| UE#3 | +491713456789 | Yes | Preamble #3 |
| UE#4 | — | No | — |

When a main UEs in idle mode enters the coverage area of the HeNB, the UE starts the mobile radio cell search procedure as usual. The main UE decodes the mobile radio cell ID of the HeNB and matches the mobile radio cell ID with the preamble relation in a stored list (e.g., HeNB mobile radio cell ID← →permanent preamble ID). This indicates to the main UE that the preamble may be used for all kind of random access in this mobile radio cell. The main UE will read the allowed RACH occasions from the system information and start performing a random access procedure by transmitting the permanent random access preamble. The HeNB receives the preamble and sets the status of the UE to "within coverage area". In some embodiments, this status can be used to indicate to other UEs that the main UE is now at home or to trigger other actions, such as playing messages from a local voice mail box on the UE.

To keep the status of the UE up-to-date, the main UE may periodically transmit the permanent dedicated preamble to the HeNB, indicating that the main UE is still within the coverage area of the HeNB while in idle mode. When a main UEs has an ongoing connection, the HeNB inherently knows that the UE is still within the coverage area. When the HeNB does not receive a "proof of presence" messages within a certain time period, the HeNB will change the status of this UE to "absent".

Figures 5C, 5D:
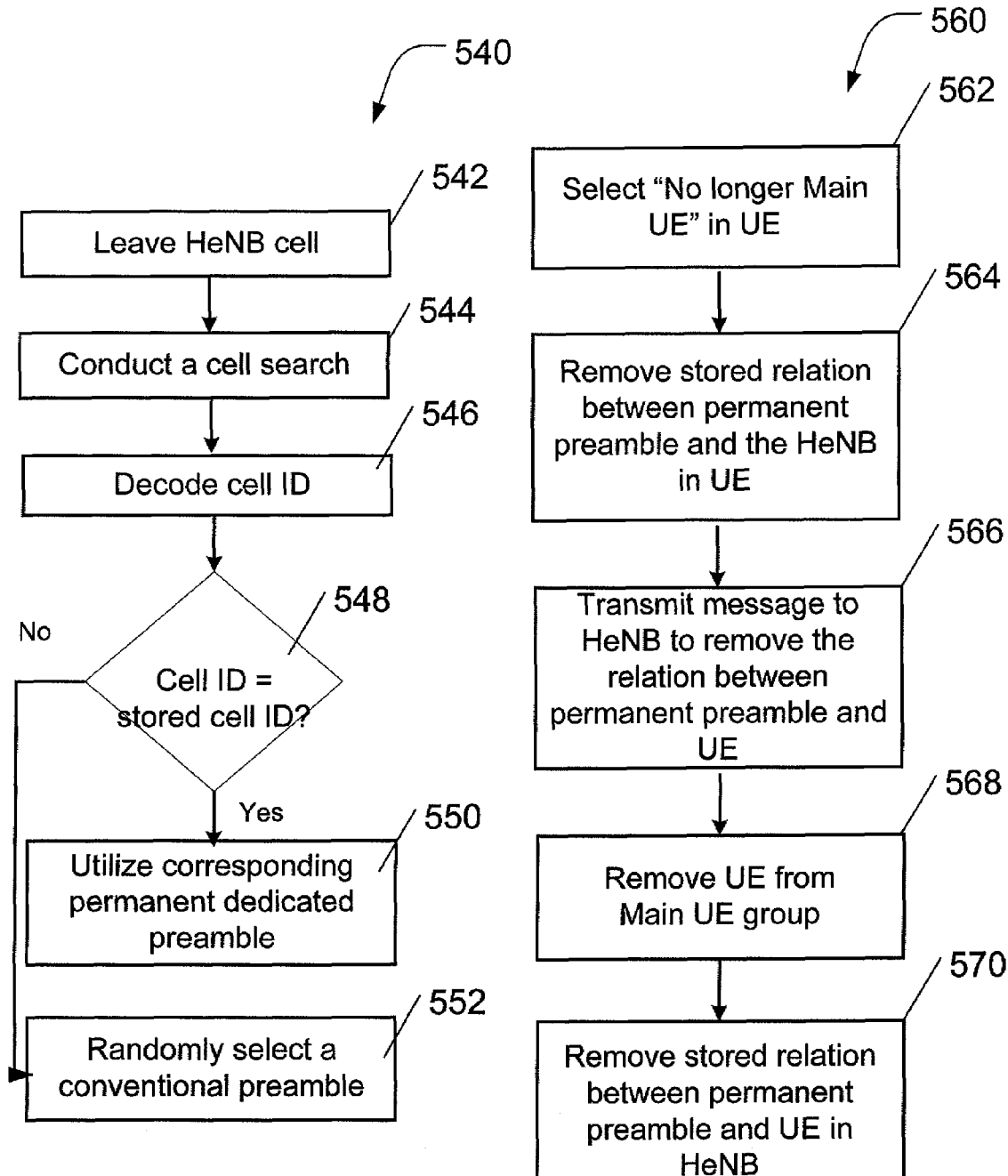

FIGS. 5A-5D are flowcharts of methods for releasing a permanent dedicated preamble in accordance with embodiments. FIG. 5A shows a first such method 500. At 502, the HeNB owner removes a UE from the main UE group, and thus a release condition has been met. At 504, the HeNB removes the stored relation between the preamble and the UE. At 506, the HeNB transmits a message to the corresponding UE that instructs the UE to remove the relation between the preamble and the HeNB. At 508, the former main UE removes the stored relation between the preamble and the HeNB. The former main UE will perform a contention-based random access procedure the next time it accesses the HeNB.

FIG. 5B shows another such method 520. At 522, a HeNB checks if a main UE has not been within the HeNB's coverage area for a certain time. If a main UE has not been within the HeNB's coverage area for a certain time, a release condition is met. In some embodiments, check 522 may check if a main UE has communicated with the HeNB within a certain time duration. At 524, the HeNB removes the stored relation between the preamble and the UE. At 526, the HeNB may transmit an SMS message to the corresponding UE that instructs the UE to remove the relation between the preamble and the HeNB. This method adapts the main UE group settings automatically when, for example, a main UE user no longer resides near the HeNB, changes a mobile subscription, or a mobile radio communication terminal device such as e.g. a mobile phone.

FIG. 5C shows another such method 540. At 542, a main UE leaves a HeNB cell, wherein the main UE has been communicating with the HeNB utilizing a permanent dedicated preamble. At 544, the main UE starts a mobile radio cell search. At 546, the main UE decodes a mobile radio cell ID of a base station. At 548, the main UE checks if the mobile radio cell ID matches a stored relation of a mobile radio cell ID and preamble ID. If a match is found, the main UE will use the corresponding permanent dedicated preamble at 550. If a match is not found, then the UE will randomly select a conventional preamble. Thus, the permanent dedicated preamble is temporarily released until the main UE re-enters the HeNB cell area.

FIG. 5D shows another such method 560. At 562, a user selects on a main UE to remove the main UE from a main UE group, and thus a release condition has been met. At 564, the former main UE removes the stored relation between the HeNB cell ID and the UE. At 566, the former main UE transmits a message to the corresponding HeNB that instructs the HeNB to remove the relation between the preamble and the former main UE. At 568, HeNB removes the former main UE from the main UE group. At 570, the HeNB removes the stored relation between the permanent preamble and the former UE. The UE will perform a contention-based random access procedure the next time it accesses the HeNB.

Figure 6:
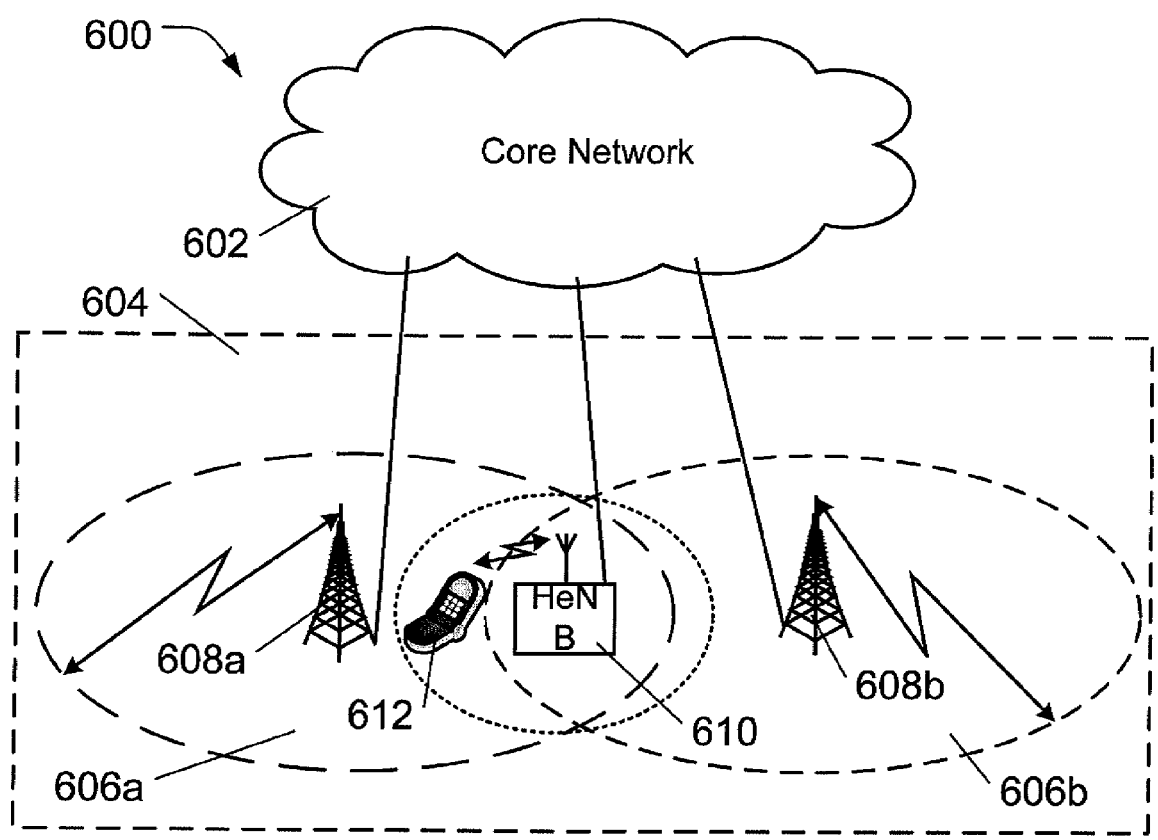
FIG. 6 shows an architectural overview of an example network architecture for use with embodiments.

Referring to FIG. 6, an architectural overview of an example mobile radio communication network architecture for use with embodiments is shown. The mobile radio communication network 600 may include mobile radio "core network" (CN) 602, and mobile radio network 604. Core network 602 is a central part of mobile radio communication network 600, is normally operated by a communication services provider, and includes both wired and wireless components that provide mobile communication services over large areas to many users. Mobile radio network 604 connects individual users to mobile radio core network 602 in order to provide communication services, and includes both wireless and wired components, some of which may be operated by the communication services provider that operates mobile radio core network 602, and some of which may be operated by others.

Mobile radio network 604 may include numerous macro cells, such as macro cells 606a and 606b, which are covered by regular eNode B base stations 608a and 608b, respectively. Within the coverage of both eNode B base stations 608a and 608b, HeNB 610 is operated. Mobile radio communication terminal device 612 (also referred to as a "user equipment" or UE in case of an implementation in accordance with 3GPP), such as a mobile radio telephone, is in wireless communication with HeNB 610, for example during an ongoing call. eNode B base stations 608a and 608b, and HeNB 610 are connected to mobile radio core network 602.

The mobile radio communication network architecture shown in FIG. 6 may be, for example, an evolved UMTS (Universal Mobile Telecommunications System) mobile radio communication network. Such a mobile radio communication network may also be referred to as and implemented in accordance with LTE (Long Term Evolution) or E-UTRA (Evolved UMTS Terrestrial Radio Access) network. In some embodiments of such an architecture, OFDMA (Orthogonal Frequency-Division Multiple Access) may be used an a downlink multiple access scheme, and/or SC-FDMA (Single-Carrier Frequency-Division Multiple Access) may be used as an uplink multiple access scheme.

Figure 7A:
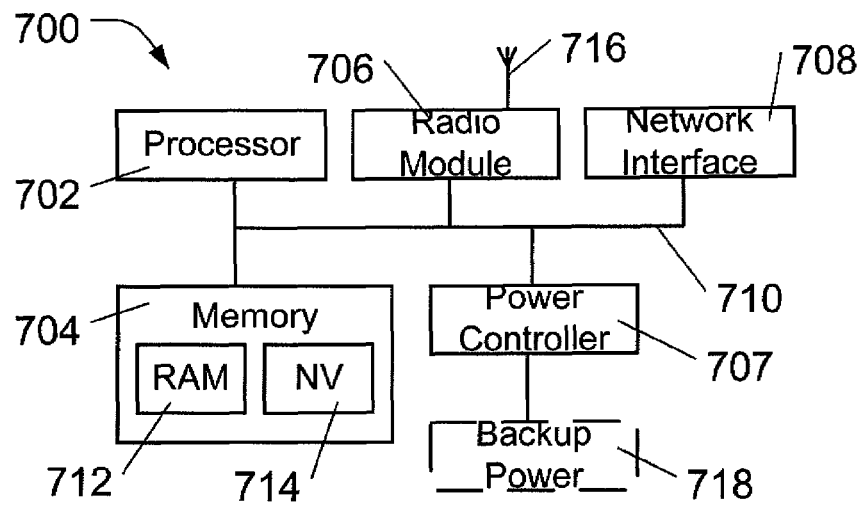
FIG. 7A shows a block diagram of an architecture for a femtocell for use with embodiments.

FIG. 7A shows a block diagram of an architecture for femtocell 700 for use with embodiments. Femtocell 700 may include processor 702, memory 704, radio module 706, power controller 707, and network interface 708, connected by bus 710. In some embodiments, memory 704 may include random access memory 712, such as conventional DRAM, and non-volatile memory 714, such as conventional flash memory, for storing the firmware that operates femtocell 700, as well as other parameters and settings that should be retained by femtocell 700.

Radio module 706 may include antenna 716, which is used for communication wirelessly with one or more mobile communication devices, such as mobile radio telephones. In some embodiments, radio module 706 may include or be a transceiver. Network interface 708 may connect femtocell 700 to the mobile radio core network, and may be a conventional wired network interface, such as a DSL interface, an Ethernet interface, or a USB interface that connects to an external computer or network interface device for connection to the mobile radio core network. Alternatively, network interface 708 may be a wireless network interface, that communicates with the mobile radio core network via a wireless local-area network, a wireless metropolitan area network or a wireless wide area network.

Femtocell 700 may be housed in a compact, portable housing (not shown), and may be powered by a conventional home power connection (not shown), via network interface 708 (e.g., power via a USB connection or power over Ethernet), or by other conventional methods of powering an electronic device. In some embodiments, femtocell 700 may include backup power source 718, such as a battery (which may be a rechargeable battery) connected to power controller 707, which may provide power for femtocell 700 to continue operation for a limited duration in the event of a power loss, such as may occur if femtocell 700 is unplugged or switched off.

It will be understood that the architecture shown in FIG. 7A is only one possible architecture for femtocell 700, and that there may be many variations or additions to the architecture. For example, femtocell 700 may include I/O devices, such as a display (not shown), a smart card interface and a smart card (not shown), to verify that femtocell 700 is authorized for operation, or a variety of indicator lights or LEDs (not shown), to indicate the current status of femtocell 700. It will also be understood that femtocell 700 embodiments include access point base stations, HNBs, and HeNBs.

Figure 7B:
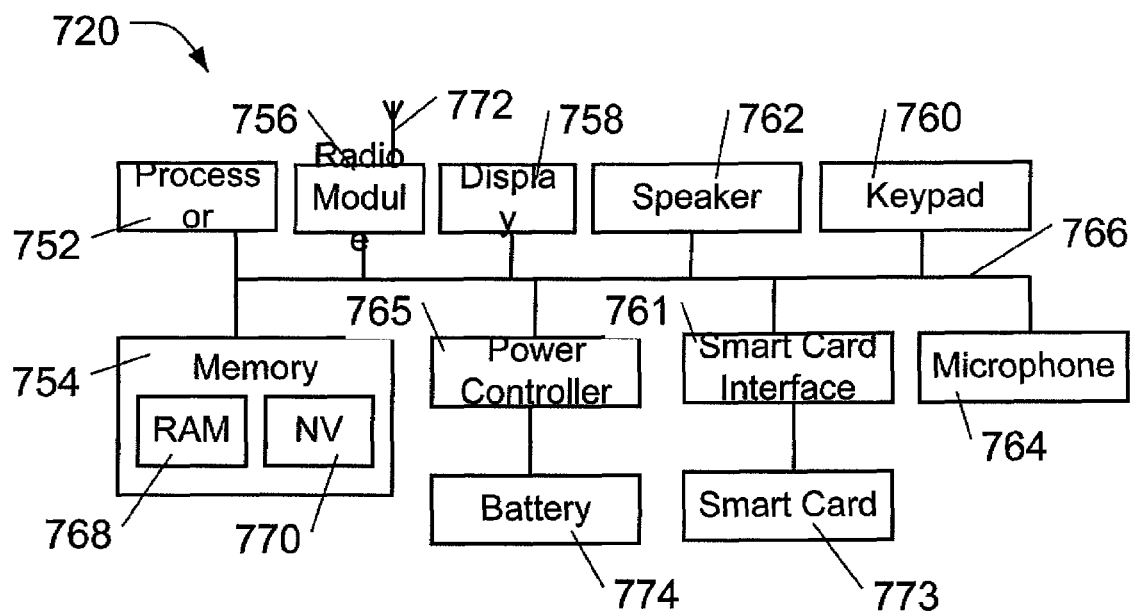
FIG. 7B shows a block diagram of an example architecture of a mobile communication device for use with embodiments.

FIG. 7B shows a block diagram of an example architecture of mobile radio communication terminal device 720 (in this example, a mobile radio telephone), for use with embodiments. Mobile communication device 720 may include processor 752, memory 754, radio module 756, display 758, keypad 760, smart card interface 761, speaker 762, microphone 764, and power controller 765, all connected by bus 766. In some embodiments, memory 754 may include random access memory 768, such as conventional DRAM, and non-volatile memory 770, such as conventional flash memory, for storing the firmware that operates mobile communication device 720, as well as other parameters and settings that should be retained by mobile communication device 720. Radio module 756 may include antenna 772, and may be used to communicate wirelessly with a femtocell. In some embodiments, radio module 756 is a transceiver.

Smart card interface 761 may be used to connect smart card 773 to mobile radio communication terminal device 720. Examples of such smart cards include SIM (Subscriber Identity Module) cards, UICC (Universal Integrated Circuit Card) smart cards with integrated SIM or USIM (Universal Subscriber Identity Module), or other types of smart cards.

Mobile radio communication terminal device 720 may be housed in a compact portable housing (not shown). For purposes of mobility, mobile radio communication terminal device 720 would typically be powered by battery 774 connected to power controller 765.

It will be understood that the architecture shown in FIG. 7B is only one possible architecture for mobile radio communication terminal device 720, and that there may be many variations or additions to the architecture. For example, speaker 762 and microphone 764 may be part of a more complex sound module, display 758 may be a touch-screen, obviating the need for the keypad 760, and/or additional I/O devices, such as a wireless personal area network interface (e.g., a BLUETOOTH wireless network interface) may be added to mobile communication device 720.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of allocating dedicated preambles for connection with a femtocell, the method comprising:
   selecting one or more mobile communication devices to be a main device;
   assigning the dedicated preambles for each of the one or more main devices to be permanently used across a plurality of random access procedures to form assigned permanent dedicated preambles, wherein each random access procedure comprises a discrete message flow using said assigned permanent dedicated preambles between one of said main devices and the femtocell;
   transmitting the assigned permanent dedicated preambles to the one or more main devices;
   storing a relation of the assigned permanent dedicated preambles in a memory of the one or more main devices; and
   explicitly releasing one or more of the assigned permanent dedicated preambles when a release condition is met.

2. The method of claim 1, wherein explicitly releasing one or more of the assigned preambles when the release condition is met comprises releasing the assigned permanent dedicated preambles when at least one of the selected mobile communication devices is deselected to be the main device.

3. The method of claim 2, wherein releasing the assigned permanent dedicated preambles when the at least one of the selected mobile communication devices is deselected to be the main device comprises releasing the assigned permanent dedicated preambles when the at least one of the selected mobile communication devices is deselected to be the main device because of a predefined period of inactivity.

4. The method of claim 1, wherein assigning the dedicated preambles for each of the one or more main devices comprises assigning permanent dedicated preambles for all kinds of random access for each of the one or more main devices.

5. The method of claim 1, further comprising temporarily releasing the assigned permanent dedicated preambles of a main device that has been removed from a coverage area of the femtocell.

6. The method of claim 1, further comprising storing a relation of the assigned permanent dedicated preambles in a memory of the femtocell.

7. A mobile communication device comprising:
   a transceiver;
   a memory; and
   a processor configured to cause the mobile communication device to:
   receive an assigned dedicated preamble to be permanently used across a plurality of random access procedures to form an assigned permanent dedicated preamble, wherein each random access procedure comprises a discrete message flow using said assigned permanent dedicated preamble between the mobile communication device and a femtocell, and wherein the assigned permanent dedicated preamble is configured to provide a non-contention based random access procedure with the femtocell;
   store a relation of the assigned permanent dedicated preamble in the memory; and
   explicitly release the assigned permanent dedicated preamble when a release condition is met.

8. The mobile communication device of claim 7, wherein the release condition is selected from a group consisting of deselecting the mobile communication device from being a main device and the mobile communication device surpassing a predefined period of inactivity.

9. The mobile communication device of claim 7, wherein the assigned permanent dedicated preamble is configured for all kinds of random access with the femtocell.

10. The mobile communication device of claim 7, wherein the processor is further configured to cause the mobile communication device to temporarily release the assigned permanent dedicated preambles.

11. The mobile communication device of claim 7, wherein the process is further configured to cause the mobile communication device to periodically transmit the assigned permanent dedicated preamble to the femtocell.

12. The mobile communication device of claim 7, wherein the relation of the assigned permanent dedicated preamble comprises associating the assigned permanent dedicated preamble with a cell ID number of the femtocell.

13. The mobile communication device of claim 7, wherein the processor is further configured to cause the mobile communication device to trigger an action when the mobile communication device enters a coverage area of the femtocell.

14. A base station comprising:
a transceiver
a memory; and
a processor configured to cause the base station to:
transmit a dedicated preamble to one or more main devices to be permanently used across a plurality of random access procedures to form assigned permanent dedicated preambles, wherein each random access procedure comprises a discrete message flow using said assigned permanent dedicated preambles between one of said main devices and the base station; and
explicitly release one or more of the assigned permanent dedicated preambles when a release condition is met.

15. The base station of claim 14, wherein the base station comprises a femtocell.

16. The base station of claim 15, wherein the processor is further configured to cause the femtocell to store a relation of the permanent dedicated preamble in the memory.

17. The base station of claim 15, wherein the processor is further configured to cause the femtocell to operate in closed, semi-open or open access mode.

18. The base station of claim 15, wherein the processor is further configured to cause the femtocell to perform a contention based random access procedure based on a random access preamble for contention-based access.

19. The base station of claim 15, wherein the processor is further configured to cause the femtocell to:
select at least one mobile communication device to be the one or more main device; and
assign the permanent dedicated preamble to each of the one or more main devices.

20. The base station of claim 15, wherein the release condition is selected from a group consisting of deselecting the one or more main devices from a main device group and the one or more main devices surpassing a predefined period of inactivity.

21. The base station of claim 15, wherein the transmitted assigned permanent dedicated preamble is configured for all kinds of random access with the femtocell and is stored in the memory of the femtocell.

22. The base station of claim 15, wherein the processor is further configured to cause the femtocell to trigger an action when the one or more main devices enters a coverage area of the femtocell.

23. The base station of claim 22, wherein the action is selected from a group consisting of alerting other mobile communication devices and playing messages from a local voice mail box on the main device that entered the coverage area of the femtocell.

24. A wireless communication network comprising:
a plurality of mobile communication devices, wherein at least one of the mobile communication devices is a main device, the main device configured to store a relation of a dedicated preamble to be permanently used across a plurality of random access procedures to form a permanent dedicated preamble, wherein each random access procedure comprises a discrete message flow using said assigned permanent dedicated preambles between the main device and a base station;
the base station configured to:
transmit the permanent dedicated preamble to the main device; and
explicitly release one or more of the permanent dedicated preambles when a release condition is met.

25. The wireless communication network of claim 24, wherein the base station comprises a femtocell.

* * * * *